United States Patent
Neystadt et al.

(10) Patent No.: US 12,443,704 B2
(45) Date of Patent: Oct. 14, 2025

(54) NETWORK SECURITY PROBE

(71) Applicant: VARONIS SYSTEMS, INC., New York, NY (US)

(72) Inventors: John Neystadt, Kfar-Saba (IL); Shay Azulay, Rishon le-Zion (IL); Amit Cohen, Kfar Saba (IL); Lior Chen, Tel Mond (IL)

(73) Assignee: VARONIS SYSTEMS, INC., New York, NY (US)

( * ) Notice: Subject to any disclaimer, the term of this patent is extended or adjusted under 35 U.S.C. 154(b) by 234 days.

(21) Appl. No.: 17/958,804

(22) Filed: Oct. 3, 2022

(65) Prior Publication Data

US 2024/0111858 A1 Apr. 4, 2024

(51) Int. Cl.
  *G06F 21/55* (2013.01)
  *G06F 21/62* (2013.01)

(52) U.S. Cl.
  CPC ........ *G06F 21/552* (2013.01); *G06F 21/6245* (2013.01); *G06F 2221/034* (2013.01)

(58) Field of Classification Search
  CPC ............... G06F 21/552; G06F 21/6245; G06F 2221/034; G06F 21/53; G06F 21/564; H04L 63/1491; H04L 43/062; H04L 41/145; H04L 63/1441; H04L 63/1433; H04L 51/212; H04L 63/1425; H04L 63/1416; H04L 63/1408; H04L 41/0886; H04L 41/0816
  See application file for complete search history.

(56) References Cited

U.S. PATENT DOCUMENTS

| | | | |
|---|---|---|---|
| 9,686,293 B2 | 6/2017 | Golshan et al. | |
| 2004/0205243 A1* | 10/2004 | Hurvig et al. | H04L 61/4511 709/245 |
| 2016/0306980 A1* | 10/2016 | Kotler | G06F 21/577 |
| 2017/0223046 A1* | 8/2017 | Singh | H04L 29/06 |
| 2018/0018462 A1 | 1/2018 | Grossman et al. | |
| 2018/0357422 A1 | 12/2018 | Telang et al. | |

OTHER PUBLICATIONS

An International Search Report and a Written Opinion both dated Jan. 31, 2024, which issued during the prosecution of Applicant's PCT/IL2023/051048.

* cited by examiner

*Primary Examiner* — Anthony D Brown
*Assistant Examiner* — Kamryn J Gillespie
(74) *Attorney, Agent, or Firm* — Sughrue Mion, PLLC

(57) ABSTRACT

A system for automatically monitoring efficacy of security controls in a computer network, including a probe engine configurable with at least one set of rules relating to access permissions to data in the computer network, at least one security probe forming part of the probe engine and operative to automatically place, at at least one storage location within the computer network and with access permissions that are non-compliant with the at least one set of rules, simulated data corresponding to the data in the computer network and attempt to access the simulated data following the placement thereof, using access privileges satisfying the non-compliant access permissions, and a security monitoring and reporting module operative to provide a user sensible output indicating at least whether the attempt to access the simulated data was successful and, if so, reporting mitigating activities by the security controls in response to the successful attempt.

13 Claims, 5 Drawing Sheets

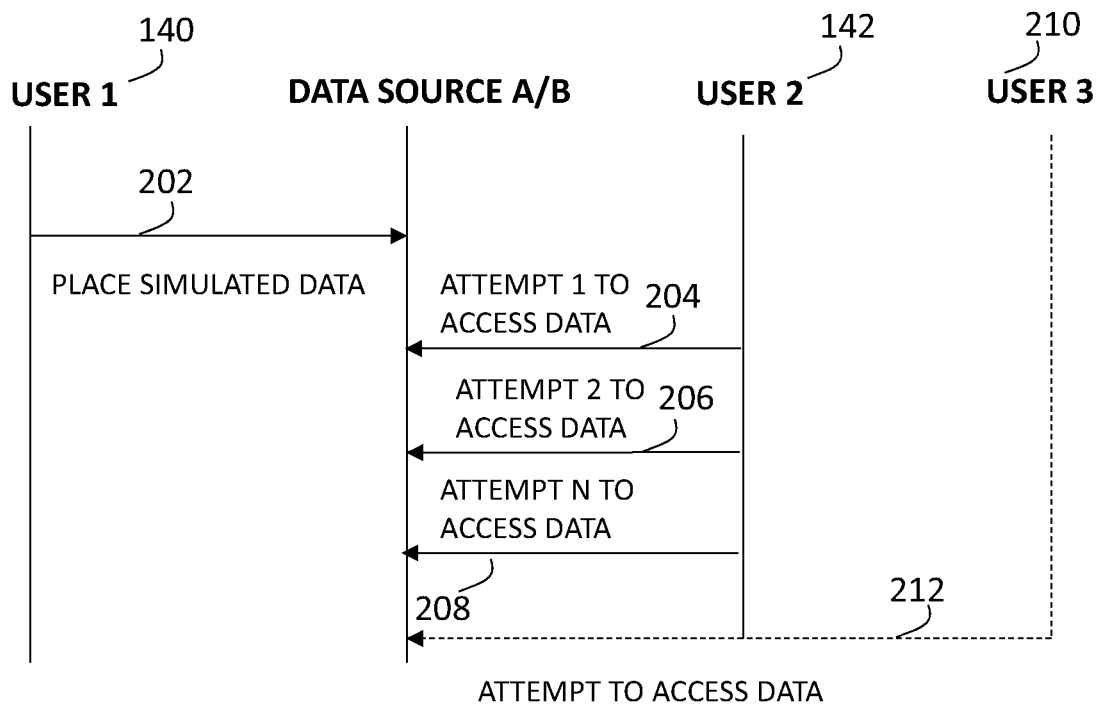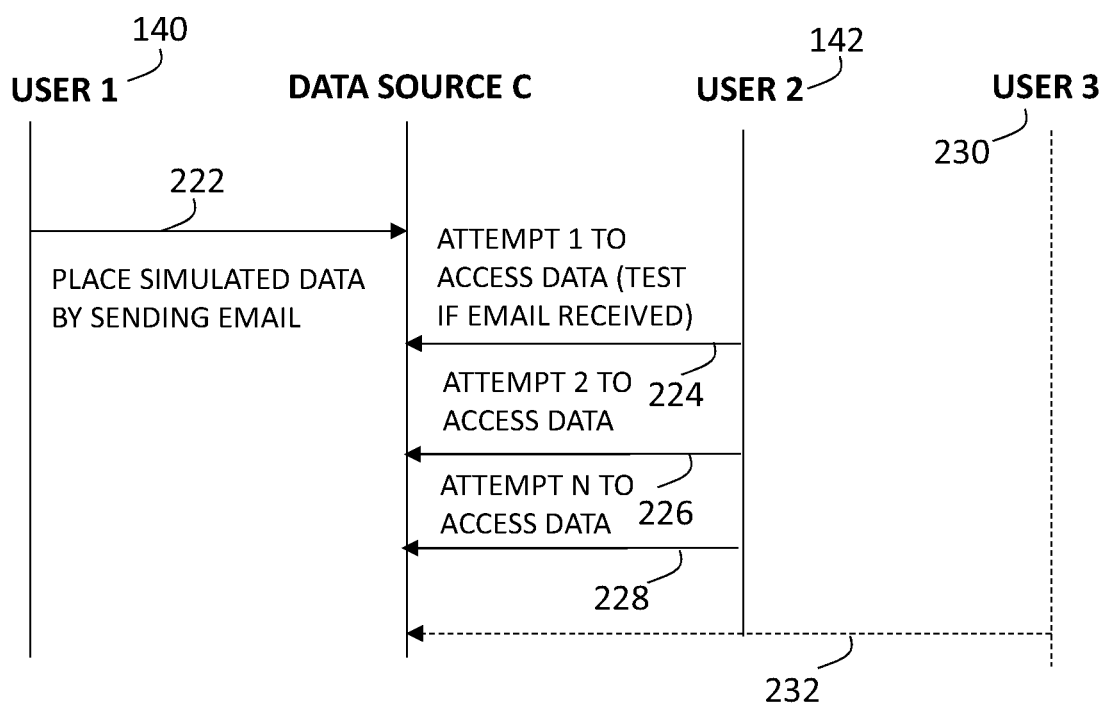

NETWORK SECURITY PROBE

FIELD OF THE INVENTION

The present invention relates generally to security controls for computer networks and more specifically to automated systems and methods for monitoring the efficacy of security controls in a computer network.

BACKGROUND OF THE INVENTION

Various types of automated systems and methods for security control of computer networks are known in the art.

SUMMARY OF THE INVENTION

The present invention seeks to provide improved automated systems and methods relating to monitoring the efficacy of security controls in computer networks, using simulated data.

There is thus provided in accordance with a preferred embodiment of the present invention a system for automatically monitoring efficacy of security controls relating to access control in a computer network, including a probe engine configurable with at least one set of rules relating to access permissions to data in the computer network, at least one security probe forming part of the probe engine and operative to automatically place, at at least one storage location within the computer network and with access permissions that are non-compliant with the at least one set of rules, simulated data corresponding to the data in the computer network and attempt to access the simulated data following the placement thereof, using access privileges satisfying the non-compliant access permissions, and a security monitoring and reporting module operative to provide a user sensible output indicating at least whether the attempt to access the simulated data was successful and, if so, reporting mitigating activities by the security controls in response to the successful attempt.

Preferably, the at least one set of rules includes at least one of a general compliance regime and an organization-specific compliance regime.

Preferably, the system also includes a data generator forming part of the probe engine and operative to automatically generate the simulated data.

Preferably, the data generator is operative to automatically generate the simulated data based on at least one of the compliance regime and machine learning based on training data pre-classified in accordance with the at least one compliance regime.

Preferably, the security probe is operative to place the simulated data at the storage location using a first user credential representing a first user within the organization and to access the simulated data using at least a second user credential representing at least a second user within the organization.

Preferably, the non-compliant access permissions include access permissions to at least one access group within the organization, the second user belonging to the at least one access group.

In accordance with one preferred embodiment of the present invention, the at least one second user credential includes a plurality of user credentials representing a corresponding plurality of second users within the organization, the second users belonging to mutually different access groups.

Preferably, the security monitoring and reporting module is operative to report a lapse of time between the successful attempt and performance of the mitigating activities and to rank different ones of the mitigating activities based on the lapse of time.

Preferably, the security monitoring and reporting module is operative to rank a severity of different ones of the successful attempts to access simulated data, based on a relative sensitivity of the simulated data that was successfully accessed in the different attempts.

Preferably, the system also includes an automatic mitigation module, operative to automatically perform a mitigating action in response to the successful attempt, in the absence of a report of the mitigating activities by the security monitoring and reporting module.

Preferably, the mitigating action by the mitigation module includes removing permission to access to the storage location.

There is additionally provided in accordance with another preferred embodiment of the present invention a system for automatically monitoring efficacy of security controls in a computer network, including a probe engine configurable with at least one set of compliance rules relating to data in the computer network, a data generator module operative to automatically generate simulated data corresponding to at least some of the data governed by the compliance rules, at least one security probe forming part of the probe engine and automatically operative to attempt to place the simulated data in a manner non-compliant with the at least one set of compliance rules and verify, following the attempt, whether the attempt to place the simulated data in the non-compliant manner was successful, and a security monitoring and reporting module operative to provide a user sensible output indicating at least whether the attempt to place the simulated data was successful and, if so, reporting mitigating activity by the security controls in response to the successful attempt.

Preferably, the at least one set of rules includes at least one of a general compliance regime and an organization-specific compliance regime.

Preferably, the data generator module is operative to automatically generate the simulated data based on at least one of the compliance rules and machine learning based on training data pre-classified in accordance with the compliance rules.

Preferably, the security monitoring and reporting module is operative to report a lapse of time between the successful attempt and performance of the mitigating activities and to rank different ones of the mitigating activities based on the lapse of time.

Preferably, the security monitoring and reporting module is operative to rank a severity of different ones of the successful attempts to access simulated data, based on a relative sensitivity of the simulated data that was successfully accessed in the different attempts.

Preferably, the system also includes an automatic mitigation module, operative to automatically perform a mitigating action in response to the successful attempt, in the absence of a report of the mitigating activities by the security monitoring and reporting module.

Preferably, the action by the mitigation module includes removing permission to access to the storage location.

There is further provided in accordance with yet another preferred embodiment of the present invention a method for automatically monitoring efficacy of security controls relating to access control in a computer network, including configuring a probe engine with at least one set of rules relating to access permissions to data in the computer network, automatically placing, at at least one storage location within the computer network and with access permissions that are non-compliant with the at least one set of rules, simulated data corresponding to the data in the computer network, attempting to access the simulated data following the placement thereof, using access privileges satisfying the non-compliant access permissions, and providing a user sensible output indicating at least whether the attempt to access the simulated data was successful and, if so, reporting mitigating activities by the security controls in response to the successful attempt.

There is yet further provided in accordance with still another preferred embodiment of the present invention a method for automatically monitoring efficacy of security controls in a computer network, including configuring a probe engine with at least one set of compliance rules relating to data in the computer network, automatically generating simulated data corresponding to at least some of the data governed by the compliance rules, attempting to place the simulated data in a manner non-compliant with the at least one set of compliance rules, verifying, following the attempting, whether the attempting to place the simulated data in the non-compliant manner was successful and providing a user sensible output indicating at least whether the attempting to place the simulated data was successful and, if so, reporting mitigating activity by the security controls in response to the successful attempting.

BRIEF DESCRIPTION OF THE DRAWINGS

The present invention will be understood and appreciated more fully based on the following detailed description taken in conjunction with the drawings in which:

FIGS. 2A and 2B are simplified diagrams illustrating first and second embodiments of data flow between components of a system of the type shown in FIG. 1;

DETAILED DESCRIPTION OF PREFERRED EMBODIMENTS

Figure 1:
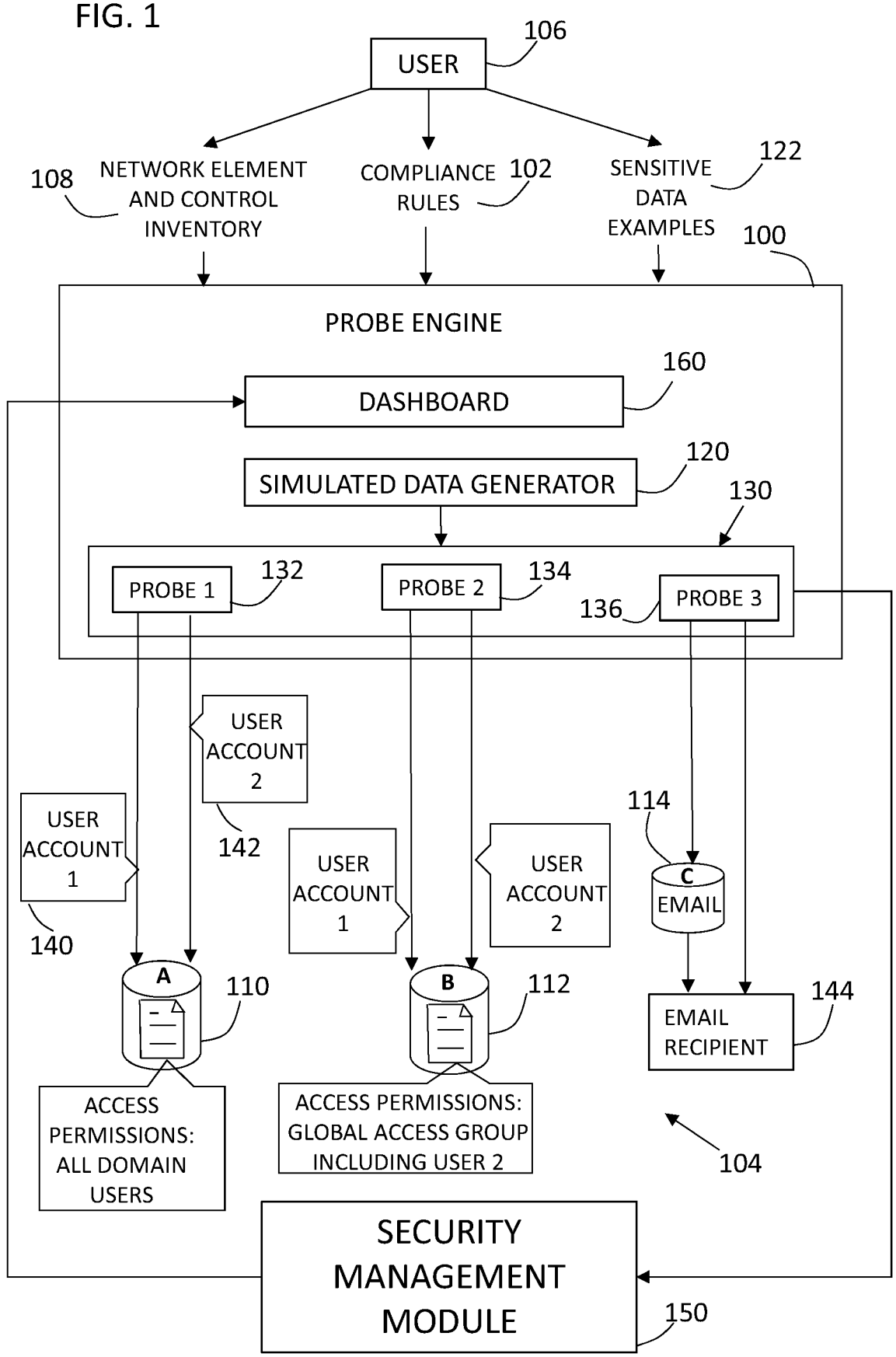
FIG. 1 is a simplified block diagram illustration of a system for automatic monitoring of efficacy of security controls in a computer network, constructed and operative in accordance with a preferred embodiment of the present invention.

Reference is now made to FIG. 1, which is a simplified block diagram illustration of a system for automatic monitoring of efficacy of security controls in a computer network, constructed and operative in accordance with a preferred embodiment of the present invention.

As seen in FIG. 1, the system of the present invention preferably includes a probe engine 100 configurable with at least one set of compliance rules 102 relating to data in a computer network, here generally indicated by reference number 104. The compliance rules 102 with which probe engine 100 is configured may be general standardized compliance rules, such as Payment Card Industry Data Security Standard (PCI DSS) or Health Insurance Portability and Accountability Act (HIPAA) standards. Compliance rules 102 may additionally or alternatively include organization-specific compliance rules or policies, individually tailored to or developed by the specific organization to which computer network 104 belongs. It is a purpose of the systems and methods of the present invention to monitor the efficacy of security controls of computer network 104 with respect to ensuring compliance, with the compliance rules 102, of access to and/or movement of data in the computer network.

In accordance with a particularly preferred embodiment of the present invention, compliance rules 102 may relate to access permissions to data in computer network 104. For example, compliance rules 102 may include indications of acceptable and unacceptably broad access permissions to sensitive data governed by the compliance rules 102. In accordance with other preferred embodiments of the present invention, compliance rules do not necessarily relate to access permissions to data and may alternatively relate to other aspects of data security, such as data exfiltration. In this case, compliance rules 102 may include indications of permitted and prohibited locations to which various data from within computer network 104 may be exfiltrated, for example by email or network transfer.

Compliance rules 102 may be supplied to probe engine 100 by a user 106 of probe engine 100. By way of example, probe engine 100 may include a user interface for inputting thereat, by user 106, compliance rules 102 to probe engine 100. In addition to compliance rules 102, probe engine 100 may also be supplied, preferably by user 106, with a network element and control inventory 108. Network element and control inventory 108 preferably includes an inventory of the network elements included in computer network 104 and of the security controls applied thereto. For example, network element and control inventory 108 may include a Configuration Management Database (CMDB) and a list of security controls applied thereto. It is appreciated that compliance rules 102 and network element and control inventory 108 may alternatively be automatically supplied to probe engine 100.

Here, by way of highly simplified example only, computer network 104 is shown to include three network elements, namely a first file server A, indicated by reference number 110, a second file server B, indicated by reference number 112, and an email server C, indicated by reference number 114, each respectively protected by security controls (not shown). It is appreciated, however, that a computer network 104 with which the present invention may be implemented may be a very complex network including a multiplicity of interlinked entities, including, but not limited to, file servers, SAAS applications, network segments, AD forests, email servers and more. Various types of security controls that may be applied to such a computer network are well known in the art and include, by way of example only, disallowing sending confidential documents containing sensitive data over email, disallowing uploading documents with PII to personal SAAS accounts and requiring that PCI information may only be shared with a finance department in an organization.

Probe engine 100 preferably, but not necessarily, includes a simulated data generator 120 for automatically generating simulated data corresponding to at least some of the data governed by compliance rules 102. Alternatively, simulated data corresponding to at least some of the data governed by compliance rules 102 may be provided to the system of the present invention by external simulated data generation functionality, various types of which are well known in the art.

Probe engine 100 may optionally be provided, preferably by user 106, with indications or examples of sensitive data 122 governed by compliance rules 102. Examples of sensitive data may include, by way of example only, customers' names, social security numbers or a list of customer credit cards numbers. Simulated data generator 120 may be operative to receive the user-provided examples of sensitive data and automatically generate simulated sensitive data based thereon.

Alternatively, in accordance with a particularly preferred embodiment of the present invention, probe engine 100 need not necessarily receive examples of sensitive data from user 106. Rather, probe engine 100 may be operative to automatically generate simulated sensitive data without requiring explicit examples thereof from a user, but rather based on compliance rules 102. Simulated data generator may be operative to derive examples of sensitive data 'on its own' by considering the data to which the compliance rules 102 apply.

It is understood that simulated data generator 120 may be operative in accordance with either of the above-described approaches for any type of compliance rules 102, including industry standardized compliance rules or customer specific compliance rules, and including compliance rules relating to access permissions and/or to other aspects of security control of data.

In the case that simulated data generator 120 is operative to generate simulated sensitive data autonomously, simulated data generator 120 may be operative to automatically generate simulated terms or series of numbers, or both, that match terms or numerical sequences to which rules of compliance rules 102 apply, including regular expressions, distance between words, or values from a predefined list. Furthermore, for topic-based rules, simulated data generator 120 may automatically generate words or terms that match a given topic. Additionally, simulated data generator 120 may automatically generate simulated sentences by placing generated words separated by distances delineated in the compliance rules 102. It is appreciated that simulated data generator 120 is not limited to generating simulated sensitive data in the particular ways described herein, and may be operative to automatically generate simulated sensitive data by other techniques known in the art. The automatic generation of simulated sensitive data by simulated data generator 120 is highly advantageous, since it reduces time and required user input and ensures that the simulated sensitive data is automatically updated responsive to changes to compliance rules 102, as these changes may occur. Further details pertaining to the operation of simulated data generator 120 are provided henceforth with reference to FIG. 3.

Simulated data generator 120 is preferably operative to provide the simulated data automatically generated thereby to at least one security probe 130, forming part of probe engine 100. Here, by way of example, probe engine 100 is shown to include a first security probe 132, a second security probe 134 and a third security probe 136. Security probes 132, 134 and 136 are in respective cooperative communication with file server A 110, file server B 112 and file server C 114. Security probes, such as security probes 132, 134 and 136 may be provided in the form of plugin modules to probe engine 100, for each network element of interest in computer network 104.

Each security probe 130, such as each of security probes 132, 134 and 136, is preferably operative to place, at at least one storage location within computer network 104 and in a manner non-compliant with the at least one set of rules 102, simulated data corresponding to the data in the computer network 104. The simulated data placed by security probes 130 is preferably that simulated data generated by simulated data generator 120. Following the placement of the simulated data, each security probe is preferably operative to verify whether the non-compliant placement of the simulated data was or was not successful.

In accordance with one preferred embodiment of the present invention, a security probe, such as security probe 132 or 134, is operative to place at at least one storage location within the computer network and with access permissions that are non-compliant with the at least one set of rules 102, simulated data corresponding to the data in the computer network 104. Subsequently, the security probe is operative to attempt to access the simulated data following the placement thereof, using access privileges satisfying the non-compliant access permissions.

As seen in the example in FIG. 1, security probe 132 may be operative to place simulated data on file server A and security probe 134 may be operative to place simulated data on file server B.

Security probes 132 and 134 are preferably operative to place the simulated data on file servers A and B respectively with access permissions that are non-compliant with compliance rules 102. By way of example, first probe 132 may place simulated data on file server A with access permissions allowing access to all domain users, which breadth of access is unacceptably broad and is non-compliant with compliance rules 102 relating to the data corresponding to the simulated data placed by probe 132. Further by way of example, security probe 134 may place simulated data on file server B with access permissions allowing access to a particular global access group within the organization to which computer network 104 belongs. In this scenario, access by that particular global access group to data corresponding to the simulated data placed by probe 134 is not in compliance with compliance rules 102.

In one preferred embodiment of the present invention, the security probe 130 is operative to place the simulated data at the storage location using a first configured user credential representing a first user within the organization and to access the simulated data using at least a second user credential representing at least a second user within the organization.

Returning to the example of probes 132 and 134 in FIG. 1, first security probe 132 may save simulated data on file server A using a first set of user credentials, indicated as 'USER ACCOUNT 1' 140 and with access permissions allowing access to all domain users. Subsequently, first security probe 132 may attempt to access the simulated sensitive data saved on file server A using a second set of user credentials indicated as 'USER ACCOUNT 2' 142. Preferably, USER ACCOUNT 2 belongs to a user within the organization such that USER ACCOUNT 2 would be allowed to access the simulated sensitive data saved on file server A based on the access permissions to all domain users with which the simulated data was saved by security probe 132. However, USER ACCOUNT 2 is prohibited access to simulated sensitive data based on compliance rules 102. The placing of the simulated data, by first security probe 132, on file server A with access permissions to all domain users thus constitutes a simulated security breach. Security controls of computer network 104, if working properly, ought to prevent such a breach by preventing attempted access, by first security probe 132 to the simulated data saved on file server A.

In another example, second security probe 134 may store simulated data on file server B with first set of user credentials 'USER ACCOUNT 1' and with access permissions allowing access to a particular global access group. Subsequently, second security probe 134 may attempt to access the simulated sensitive data saved on file server B using the second set of user credentials 'USER ACCOUNT 2'. Preferably, USER ACCOUNT 2 belongs to the particular global access group specified by USER ACCOUNT 1 when placing the simulated data on file server B, such that USER ACCOUNT 2 would be allowed to access the simulated sensitive data as saved on file server B. However, USER ACCOUNT 2 is prohibited access to the simulated sensitive data based on compliance rules 102. The placing of the simulated data, by second security probe 134 on file server B with access permissions specifying the particular access group thus constitutes a security breach. Security controls of computer network 104, if working properly, ought to prevent such a breach by preventing attempted access, by second security probe 134, to the simulated data saved on filer server B.

It is appreciated that the user accounts employed by one probe engine for placing the simulated data and subsequently attempting to access that data, in keeping with the access permissions with which the data was placed but in violation of compliance rules 102 governing access to that data, may be the same or different as those employed by another probe engine. In the above examples, USER ACCOUNTS 1 and 2 employed by first probe engine 132 may be the same as or different to respective accounts USER ACCOUNTS 1 and 2 employed by second probe engine 134.

Additionally, simulated data may be placed by security probes 130 at a location, such as file server A or B, specifying more than one set of access permissions, rather than only a single set of access permissions as exemplified with reference to FIG. 1. The security probe 130 may subsequently attempt to access the simulated data at the location using more than one user account.

Furthermore, it is appreciated that the user accounts employed by security probes 130 of the present invention may be actual user accounts belonging to users of computer network 104 or may be special user accounts created for the probe of the present invention. Since the breach carried out by security probes 130 involves simulated data, as generated by simulated data generator 120, rather than examples of actual sensitive data, there is no risk involved in non-compliant access to the data.

Additionally or alternatively to security probes 130 creating breaches in relation to access permissions, security probes 130 may create breaches in other security policies relating to the simulated sensitive data. Returning to the example of third security probe 136 in FIG. 1, third security probe 136 may be operative to attempt to place the simulated data in a manner non-compliant with compliance rules 102 by attempting to email simulated data via email server C 114 to an email recipient 144. Email recipient 144 may be an email recipient outside of computer network 104 and thus prohibited, by compliance rules 102, to receive the sensitive data. Alternatively, email recipient 140 may be an email recipient within computer network 104 but nonetheless prohibited, by compliance rules 102, to receive sensitive data of the type corresponding to the simulated sensitive data included in the email.

Third security probe 136 is preferably operative to subsequently verify whether the email was successfully sent. It is appreciated that although the example of email is provided and illustrated here, other types of data transfers in non-compliance of compliance rules 102 are also possible and may be performed with simulated data by security probe 130, including other types of file transfers and data exfiltration.

The operation of security probes 130 may be initiated by a request from probe engine 100. By way of example, probe engine 100 may instruct ones of security probes 130 to place data at data locations in a non-compliant manner, as detailed hereinabove. Subsequently, probe engine 100 may request each security probe 130 to attempt to access the data using a configured second set of credentials, as in the cases of probes 132 and 134, or to otherwise verify whether the attempt to place the data was successful, as in the case of probe 136.

Security probes 130 may attempt to access the data and/or verify successful placement of the data after a time interval following placement of the data at the location by the security probe 130. The time interval may be any suitable time interval, for example, 1 minute, 1 hour, 1 day, 1 week, one month etc. Particularly preferably, the security probe may attempt to access the data and/or verify successful placement of the data repeatedly, with increasing time intervals between each repeat.

Further details concerning data flow between security probes 130 and storage locations in computer network 104 are provided henceforth with reference to FIGS. 2A and 2B.

Security probes 130 are preferably operative to verify whether the data was successfully placed at the particular attempted location, such as in the example of third security probe 136. Security probes 130 may additionally attempt to access the data using access privileges satisfying the non-compliant access permissions, such as in the examples of first and second security probes 132 and 134. If the simulated data is successfully placed and/or accessible, this is indicative that data corresponding to the simulated data is not properly protected by security controls of computer network 104 and a security breach has occurred, albeit with simulated data.

Security probes 130 are preferably in operative communication with a security management module 150. It is appreciated that although in FIG. 1 security management module 150 is illustrated as a separate module, outside of probe engine 100, security management module 150 may alternatively form a part of probe engine 100. Security management module 150, in cooperation with security probes 130, may monitor the response of security controls of computer network 104 to the attempted breaches performed by security probes 130. Security management module 150, in cooperation with security probes 130, may monitor whether security controls of computer network 104 raise an alarm to security breaches and how quickly remediation actions are implemented in response to such alarms.

Returning to the examples of file servers A and B, security management module 150 may monitor whether or not a security alert was raised, by security controls, in response to the placement of the simulated data with non-compliant access permissions; whether or not the subsequent attempt by the security probe 130 to access the placed data was successful and/or whether or not a security alert was raised, by security controls, in response to the subsequent attempt to access the placed data with such non-compliant access permissions. Security management module 150 may additionally monitor if a remediation action was implemented in response to the attempted access and, if so, the time delay to implementation of the remediation action.

Returning to the example of file sever C, security management module 150 may monitor whether or not a security alert was raised, by security controls, in response to the placement of the simulated data in a non-compliant way, in this particular example by email; whether or not the data was successfully placed, in this example whether the email was successfully received by the email recipient and/or whether or not a security alert was raised, by security controls, in response to the subsequent attempt to verify placement of the data, in this example by attempting to open the email. Security management module 150 may additionally monitor if a remediation action was implemented and, if so, the time delay to implementation of the remediation action.

Security management module 150 may additionally or alternatively be operative to report a lapse of time between the successful access attempt and performance of mitigating activities and to rank different ones of the security controls performing the mitigating activities, based on the lapse of time. Security management module 150 may also be operative to rank a relative severity of different ones of the successful attempts to access simulated data, based on a relative sensitivity of the simulated data involved in the different attempts. For example, breaches carried out by security probes 130 involving more sensitive simulated data may be ranked higher than breaches carried out by security probes 130 involving less sensitive simulated data.

In the case that, as found by security management module 150, no mitigating action is performed, security management module 150 may automatically initiate a mitigating action with respect to network 104 or with respect to particular network components, such as file servers A, B, or C, therein. For example, security management module 150 may automatically remove permission to access a breached storage location. The automatic initiation of mitigating action, in the absence of such action by pre-existing security controls in computer network 104, may be performed by an automatic mitigation module forming a part of security management module 150.

Security management module 150 is preferably in operative communication with a dashboard 160, preferably forming a part of probe engine 100. Dashboard 160 may display to user 106 some or all of the information found by security management module 150. By way of non-limiting example only, dashboard 160 may indicate, for each element of computer network 104, whether or not a security alert was raised as a result of a simulated breach by security probes 130, KPIs for each security control and/or network element, and/or a ranking of security controls and/or network elements. Such a ranking may include an indication of the top N network elements in computer network 104 having the slowest security control response time and/or the poorest performance based on response time and/or sensitivity of simulated data involved, where N may be configurable by user 106.

The probing operation performed by security probes 130 may be repeated at user-defined or pre-set intervals of time, such that changes in KPIs of security controls may be monitored over time and data relating to changes in KPI over time made available to user 106 via dashboard 160.

Further details relating to the operation of security management module 150 and dashboard 160 are provided below, with reference to FIG. 4.

It is understood that although the data provided to security probes 130 is simulated data, preferably generated by data simulator 120, all other elements of computer network 104, such as servers A, B and C are actual elements of computer network 104 and are not virtual entities. The system of the present invention thus advantageously does not require virtualization of entities of computer network 104 in order to test the efficacy of computer network 104.

Reference is now made to FIGS. 2A and 2B, which are simplified diagrams illustrating first and second embodiments of data flow between components of a system of the type shown in FIG. 1.

Turning first to FIG. 2A, an example of possible data flow in relation to data source A or B of FIG. 1 is shown in the form of a swim-lane diagram. In this example, user 1 may correspond to USER ACCOUNT 1 employed by security probe 132 of FIG. 1 and user 2 may correspond to USER ACCOUNT 2 employed by security probe 132 of FIG. 1. As detailed hereinabove with reference to FIG. 1, users 1 and 2 may be simulated or actual user credentials associated with computer network 104, which are employed by security probes of the present invention. However, it is appreciated that the data flow may apply to the flow of simulated data, as carried out by security probes 130 in any computer network, in order to monitor the efficacy of security controls thereof, and is not limited to the particular computer network configuration illustrated in FIG. 1.

As seen in FIG. 2A, simulated data may initially be placed 202 by a security probe, using 'user 1' credentials, at a storage location, such as data source A or B. The simulated data is preferably placed with access permissions to user 2 that are non-compliant with at least one set of rules governing access to data corresponding to the simulated data. Following the placement of the simulated data 202, the user security probe may attempt to access the simulated data 204 using the credentials of 'user 2'. Repeated access attempts made be made over time, for example as shown in attempts 206 and 208, in order to evaluate the response of security controls of data source A or B to the access attempts using the credentials of user 2.

Optionally, the simulated data may be placed with access permissions to more than one user. For example, the simulated data may be placed with access permissions to users 2 and an additional user 3, 210, where user 2 and user 3 preferably have different access privileges. In this case, the security probe may also attempt 212 to access the data with the credentials of user 3. These access attempts may be performed repeatedly over time, as in the case of user 2.

Turning now to FIG. 2B, an example of possible data flow in relation to email server C of FIG. 1 is shown in the form of a swim-lane diagram. In this example, user 1 may correspond to USER ACCOUNT 1 of FIG. 1 and user 2 may correspond to USER ACCOUNT 2 of FIG. 1, as employed by security probes 130. As detailed hereinabove with reference to FIG. 1, users 1 and 2 may be simulated or actual users associated with computer network 104, which are employed by security probes of the present invention. However, it is appreciated that the data flow may apply to the flow of simulated data, as carried out by security probes of the present invention, in any computer network, in order to monitor the efficacy of security controls thereof, and is not limited to the particular computer network configuration illustrated in FIG. 1.

As seen in FIG. 2B, simulated data may initially be placed by sending an email 222. The email may be sent using credentials of user 1 to user 2, in a manner that is non-compliant with at least one set of rules governing data corresponding to the simulated data. Following the placement of the simulated data 222, the security probe may attempt to access the simulated data, for example by opening the sent email 224 using the credentials of user 2. Repeated access attempts may be made over time, for example as shown in attempts 226 and 228, in order to evaluate the response of security controls of data source C to the attempts.

Optionally, the simulated data may be placed by sending an email to more than one user. For example, security probe 130 may send the simulated data via email, using credentials of user 1, to user 2 and an additional user 3, 230. In this case, security probe 130 may additionally attempt to access the data 232 using credentials of user 3. These access attempts may be performed repeatedly over time, as in the case of user 2.

It is appreciated that, for the sake of simplicity, a single placement of simulated data is shown. However, multiple files containing sensitive data may be placed at respective multiple storage locations, with one or more associated non-compliant access permissions and/or other non-compliant security aspects, in order to evaluate the efficacy of the relevant security controls.

Figure 3:
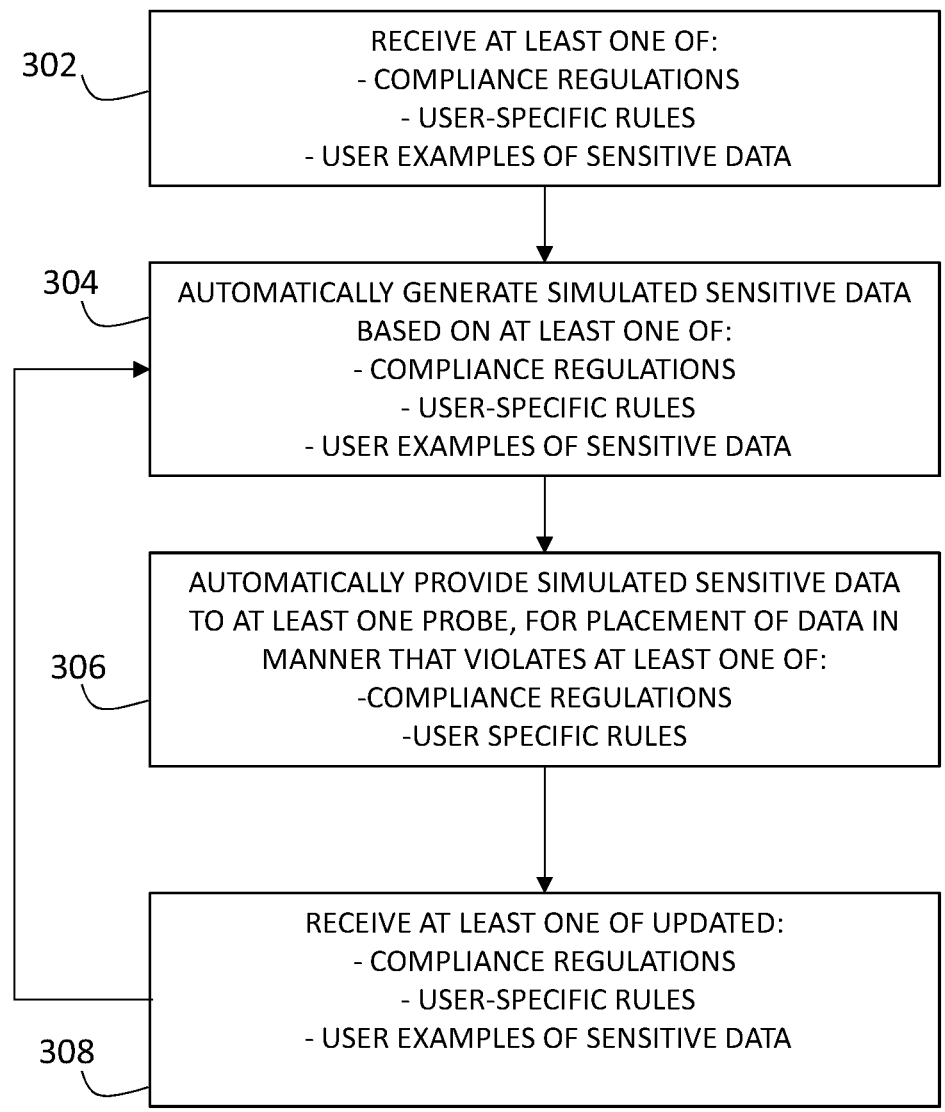
FIG. 3 is a simplified flow chart illustrating operation of a simulated data generator, useful within the system shown in FIG. 1, constructed and operative in accordance with a preferred embodiment of the present invention.

Reference is now made to FIG. 3, which is a simplified flow chart illustrating operation of a simulated data generator, useful within the system shown in FIG. 1, constructed and operative in accordance with a preferred embodiment of the present invention.

As seen in FIG. 3, operation of a simulated data generator, such as simulated data generator 120 of FIG. 1, may be better understood with reference to a flow chart 300.

As seen at a first step 302, the simulated data generator may receive at least one of compliance regulations, user-specific rules and user provided examples of sensitive data.

As seen at a second step 304, the simulated data generator is preferably operative to automatically generate simulated sensitive data, based on the received at least one of compliance regulations, user-specific rules and user provided examples of sensitive data.

As seen at a third step 306, the simulated data generator is preferably subsequently operative to provide the simulated generated data to at least one security probe, such as security probes 130 of FIG. 1, for placement of the data in a manner that violates at least one of the compliance regulations and user-specific rules.

As seen at a fourth step 308, the simulated data generator is preferably configured to receive updates to the compliance regulations, user-specific rules and user—examples of sensitive data. These updates may be received in real time, as changes are made, or not in real time. Responsive to such updates, the simulated data generator is preferably operative to automatically return to step 304 and newly generate simulated sensitive data, based on the updates.

It is appreciated that the simulated data generator may be embodied as any suitable data generation module employing appropriate data generation algorithms, such as those based on regular expressions, logic rules, listed vales etc., various types of which are known in the art.

According to one preferred embodiment of the present invention, data generation module may undergo an initial training phase, involving performing supervised machine learning on a pre-classified training set of sensitive data. This training set may be automatically generated, based on the compliance rules, or may be based on user-provided classification of sensitive data. Following training, data generation module may then be operative to generate examples of sensitive data corresponding to the training set. A benefit of such machine-learned generation based on a learned set of sample classified data is improved data randomization and more extensive validation of the data classification mechanism used by the organization.

Figure 4:
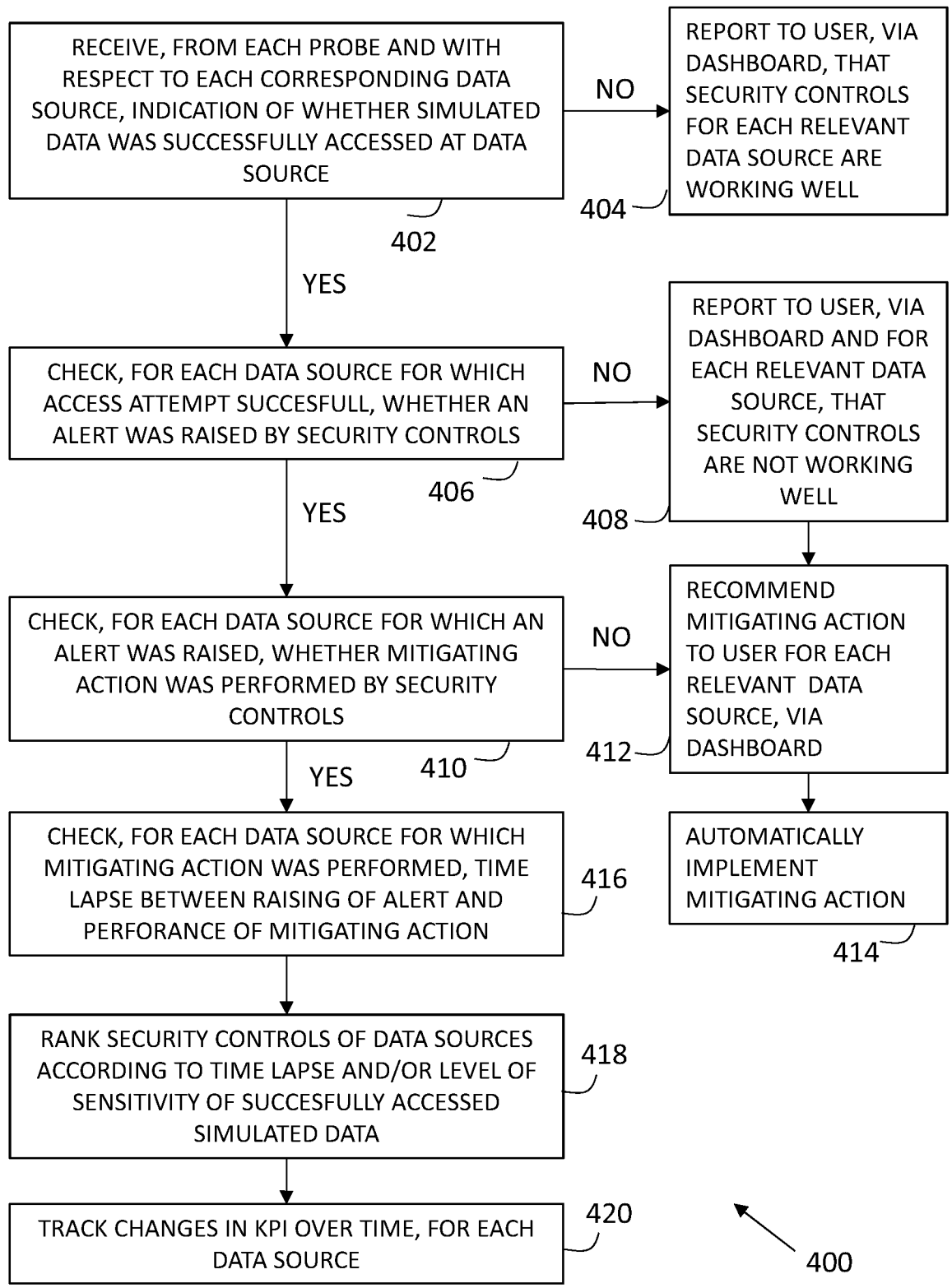
FIG. 4 is a simplified flow chart illustrating operation of a security monitoring and reporting module, useful within the system shown in FIG. 1, constructed and operative in accordance with a preferred embodiment of the present invention.

Reference is now made to FIG. 4, which is a simplified flow chart illustrating operation of a security monitoring and reporting module, useful within the system shown in FIG. 1, constructed and operative in accordance with a preferred embodiment of the present invention.

As seen in FIG. 4, operation of a security monitoring and reporting module, such as security management module 150 in cooperation with dashboard 160 of FIG. 1, may be better understood with reference to a flow chart 400.

As seen at a first step 402, the security monitoring and reporting module may receive, from each security probe and with respect to each corresponding data source or data storage location at which simulated data is stored, an indication of whether the simulated data was successfully accessed. Additionally, the security monitoring and reporting module may receive, from each security probe, an indication of whether the simulated data was initially successfully stored at that data location.

In the case that the data was not successfully stored and/or accessed, the security monitoring and reporting module may report to a user, for example via dashboard 160, that security controls for each relevant data source are working well, at a second step 404.

In the case that the data was successfully accessed, the security monitoring and reporting module may check, for each data source for which an access attempt was successful, whether an alert was raised by security controls, at a third step 406.

In the case that the no alert was found to be raised, the security monitoring and reporting module may report to a user, for example via dashboard 160, that security controls are not working well, at a fourth step 408.

In the case that an alert was found to be raised, the security monitoring and reporting module may check, for each data source for which an alert was raised, whether mitigating action was performed by the security controls, at a fifth step 410.

In the case that no mitigating action was found to be performed, the security monitoring and reporting module may, for example via dashboard 160, recommend mitigating action to the user for each relevant data source, at a sixth step 412. At a seventh step 414, the security monitoring and reporting module may automatically implement the mitigating action.

In the case that mitigating action was found to be performed, the security monitoring and reporting module may check, for each data source for which a mitigating action was performed, a time lapse between the raising of the alert and performance of the mitigating action, at an eighth step 416.

At a ninth step 418, the security monitoring and reporting module may rank security controls according to the time lapse to performance of mitigating action and/or level of sensitivity of the simulated sensitive data involved. Such a ranking may be displayed to a user, for example via dashboard 160.

Additionally, as seen at a tenth step 420, the security monitoring and reporting module may track changes in KPI for each data source, by repeating steps 402-418 over time.

It is appreciated that the functionality of the security monitoring and reporting module may be distributed between security management module 150 and dashboard 160 and that the differentiation between the processing functions of each made herein is for the purpose of convenience of explanation only.

Figure 5:
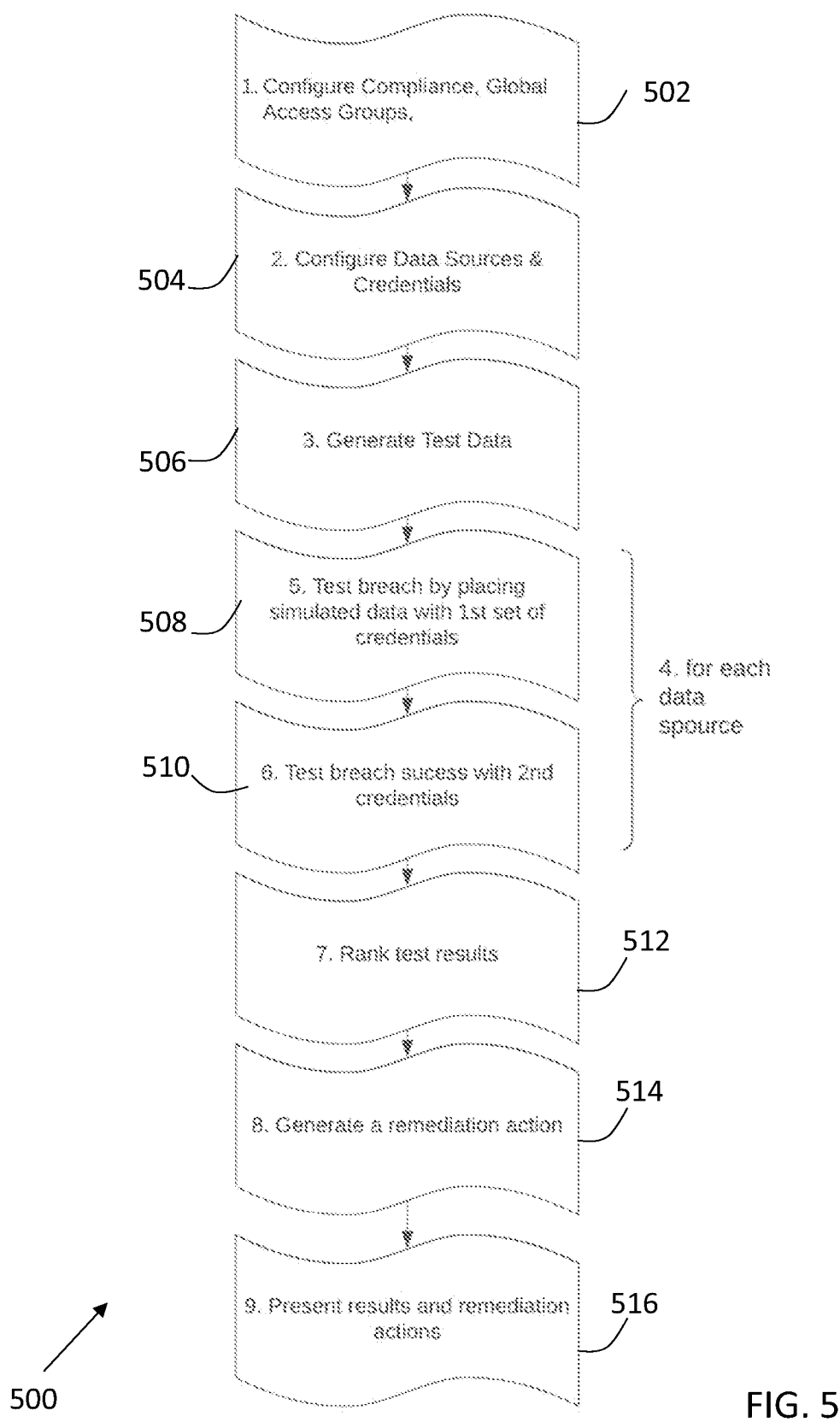
FIG. 5 is a simplified flow chart illustrating steps in a method for monitoring efficacy of security controls in a computer network, in accordance with a preferred embodiment of the present invention.

Reference is now made to FIG. 5, which a simplified flow chart illustrating steps in a method for monitoring efficacy of security controls in a computer network, in accordance with a preferred embodiment of the present invention.

As seen in FIG. 5, a method 500 for monitoring efficacy of security controls in a computer network may begin at a first step 502, by configuring compliance rules, including access rules and global access groups within an organization. At a second step 504, the method may include configuring data sources in a computer network and user credentials. The configurations of steps 502 and 504 may be input into a probe engine, such as probe engine 100 of FIG. 1.

As seen at a third step 506, test data may be generated. The test data is preferably simulated data corresponding to sensitive data governed by the compliance rules and access permissions configured at first and second steps 502 and 503. The sensitive data may be automatically generated by a simulated data generator, such as simulated data generator 120 of FIG. 1.

A breach may be simulated by placing the simulated data in a non-compliant manner, using a first set of user credentials, at a fourth step 508. The success or failure of the breach may be evaluated by attempting to access the simulated data using a second set of user credentials, at a fifth step 510. Fourth and fifth steps 508 and 510 may be performed for each data source.

Results of the attempted breach may be ranked, at a sixth step 512, and remediation action may be generated, at a seventh step 514. Results and/or remediation actions may be presented to a user, at an eighth step 516.

It will be appreciated by persons skilled in the art that the present invention is not limited by what has been particularly claimed hereinbelow. Rather, the scope of the invention includes various combinations and subcombinations of the features described hereinabove as well as modifications and variations thereof as would occur to persons skilled in the art upon reading the forgoing description with reference to the drawings and which are not in the prior art.

The invention claimed is:

1. A system for automatically monitoring efficacy of security controls relating to access control in a computer network, comprising:
a probe engine configurable with at least one set of rules relating to access permissions to data in said computer network;
at least one security probe forming part of said probe engine and operative to automatically:
place, at at least one storage location within said computer network, simulated data corresponding to said data in said computer network, said simulated data having associated therewith access permissions defining allowed access to said simulated data, said access permissions associated with said simulated data being non-compliant with said at least one set of rules; and
attempt to access said simulated data following the placement thereof, using access privileges satisfying said non-compliant access permissions associated with said simulated data, but not satisfying said at least one set of rules, and
a security monitoring and reporting module operative to provide a user sensible output indicating at least whether said attempt to access said simulated data was successful and, responsive to said attempt to access said simulated data being successful, reporting mitigating activities by said security controls in response to said successful attempt.

2. A system according to claim 1, wherein said at least one set of rules comprises at least one of a general compliance regime and an organization-specific compliance regime.

3. A system according to claim 2, and also comprising a data generator forming part of said probe engine and operative to automatically generate said simulated data.

4. A system according to claim 3, wherein said data generator is operative to:
automatically generate said simulated data based on at least one of said compliance regime and machine learning based on training data pre-classified in accordance with said compliance regime; and
automatically update said simulated data responsive to changes in said compliance regime.

5. A system according to claim 1, wherein said security probe is operative to place said simulated data at said storage location using a first user credential representing a first user within said organization and to access said simulated data using at least a second user credential representing at least a second user within said organization.

6. A system according to claim 5, wherein said non-compliant access permissions comprise access permissions to at least one access group within said organization, said second user belonging to said at least one access group.

7. A system according to claim 5, wherein said at least one second user credential comprises a plurality of user credentials representing a corresponding plurality of second users within said organization, said second users belonging to mutually different access groups.

8. A system according to claim 1, wherein said security monitoring and reporting module is operative to report a lapse of time between said successful attempt and performance of said mitigating activities and to rank different ones of said mitigating activities based on said lapse of time.

9. A system according to claim 1, wherein said security monitoring and reporting module is operative to rank a severity of different ones of said successful attempts to access simulated data, based on a relative sensitivity of the simulated data that was successfully accessed in said different attempts.

10. A system according to claim 8, and also comprising an automatic mitigation module, operative to automatically perform a mitigating action in response to said successful attempt, in the absence of a report of said mitigating activities by said security monitoring and reporting module.

11. A system according to claim 10, wherein said mitigating action by said automatic mitigation module comprises removing permission to access to said storage location.

12. A method for automatically monitoring efficacy of security controls relating to access control in a computer network, comprising:
configuring a probe engine with at least one set of rules relating to access permissions to data in said computer network;
automatically placing, at at least one storage location within said computer network, simulated data corresponding to said data in said computer network, said simulated data having associated therewith access permissions defining allowed access to said simulated data, said access permissions associated with said simulated data being non-compliant with said at least one set of rules associated with said simulated data:
attempting to access said simulated data following the placement thereof, using access privileges satisfying said non-compliant access permissions associated with said simulated data but not satisfying said at least one set of rules; and providing a user sensible output indicating at least whether said attempt to access said simulated data was successful and, responsive to said attempt to access said simulated data being successful, reporting mitigating activities by said security controls in response to said successful attempt.

13. A method according to claim 12, and also comprising:

automatically generating said simulated data based on at least one of said compliance regime and machine learning based on training data pre-classified in accordance with said compliance regime; and automatically updating said simulated data responsive to changes in said compliance regime.

\* \* \* \* \*